Dec. 9, 1924. 1,518,753
F. E. PRICE
BUMPER
Filed July 10, 1922 2 Sheets-Sheet 1
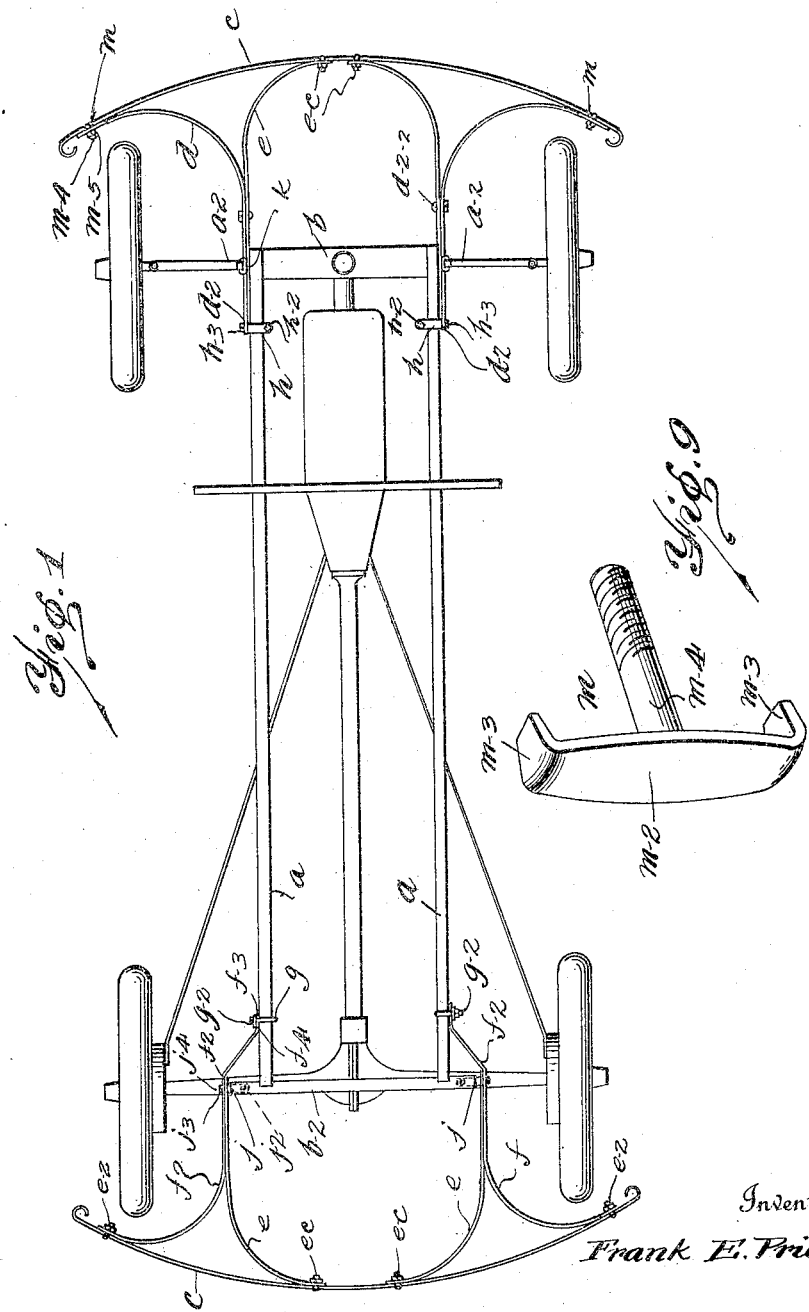

Dec. 9, 1924. 1,518,753
F. E. PRICE
BUMPER
Filed July 10, 1922   2 Sheets-Sheet 2
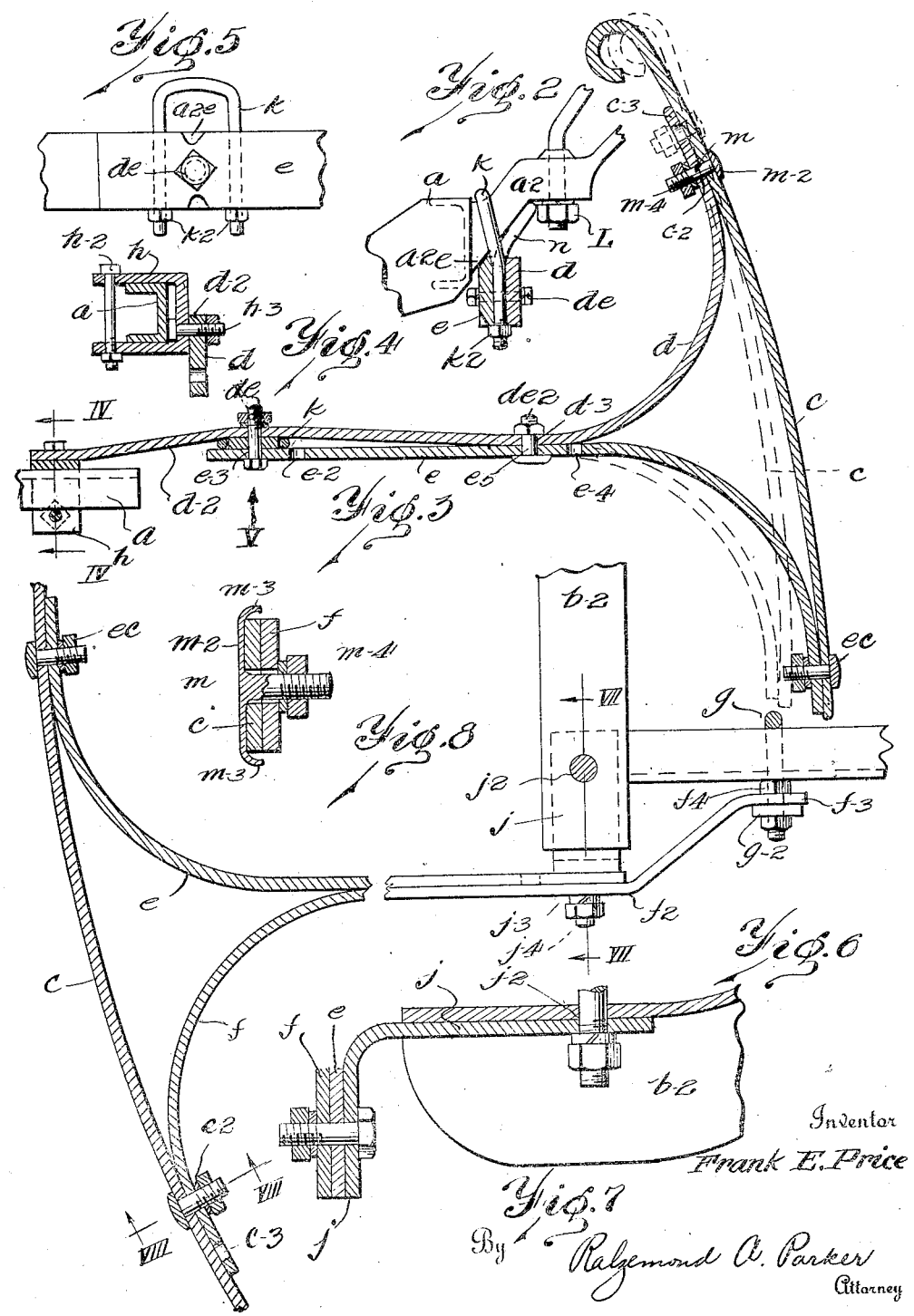

Patented Dec. 9, 1924.

1,518,753

UNITED STATES PATENT OFFICE.

FRANK E. PRICE, OF DETROIT, MICHIGAN, ASSIGNOR TO THE ANGLE BUMPER CORPORATION, OF PONTIAC, MICHIGAN, A CORPORATION OF MICHIGAN.

BUMPER.

Application filed July 10, 1922. Serial No. 573,821.

*To all whom it may concern:*

Be it known that I, FRANK E. PRICE, a citizen of the United States, residing at Detroit, county of Wayne, State of Michigan, have invented a certain new and useful Improvement in Bumpers, and declare the following to be a full, clear, and exact description of the same, such as will enable others skilled in the art to which it pertains to make and use the same, reference being had to the accompanying drawings, which form a part of this specification.

My invention relates to bumpers for automobiles, and objects of my improvements are to secure an improved bumper that may be compactly packed for transportation and readily attached to the automobile and one that will permit of the striking cross bar having different degrees of outward convexity. I secure these objects in the device illustrated in the accompanying drawings, in which:

Figure 1 is a plan view of a chassis having front and rear bumpers attached thereto embodying my invention.

Fig. 2 is a detail view, partly in elevation and partly in section, showing a part of the apparatus by which the bumper is attached to the automobile.

Fig. 3 is a detail sectional view showing the construction at one side at the front of the automobile.

Fig. 4 is a detail sectional view on the line IV—IV of Fig. 3.

Fig. 5 is a detail elevation at the position and looking in the direction indicated by the arrow V, Fig. 3.

Fig. 6 is a view, partly in section and partly in plan, similar to Fig. 3, but showing the construction at the rear of the automobile.

Fig. 7 is a detail section on the line VII—VII of Fig. 6.

Fig. 8 is a detail section on the line VIII—VIII of Fig. 6.

Fig. 9 is a perspective view of the securing bolt for the outer end of one of the outer braces of the striking cross bar.

$a$ indicates the side pieces of the chassis of an automobile; $b$ the front cross pieces, and $b^2$ the rear cross piece of the same. $c, c$ are flexible steel bars extending horizontally, transversely of the frame and in front and rear of the same, forming the striking cross bars.

The construction is the same on both sides of the automobile and, therefore, a description of the construction upon one side will be sufficient.

$d$ and $f$ are flexible outer braces and $e$ inner braces. Each of the outer braces is secured at its inner end toward the frame, bends outwardly and is secured at its outer end to the outer end of the striking cross bar $c$, and each of the inner braces is also secured at its inner ends directly or indirectly to the chassis and is bent inwardly and secured to the bar $c$ near the center of said bar. The inner end of the brace $d$ is secured by a clip $h$ to the side piece $a$ of the frame. This clip is U shape and has a bolt $h^2$ joining its ends and clamping it in position. A bolt $h^3$ passing through one of the two apertures in the end of the brace bar $d$ and through a corresponding aperture in the vertical part of the clip $h$ secures the inner end of the brace $d$ firmly to the clip.

The inner brace $e$ is secured at $ec$ to a point a little short of the center of the striking bar $c$ and is bent inwardly and its inner portion lies adjacent and approximately parallel to the brace bar $d$, as shown in Fig. 3.

$a^2$ is the fender bracket.

$k$ is a U-shaped clip passing over the fender bracket adjacent to the side piece $a$ of the automobile, its two branches extending down between the bars $d$ and $e$ (Fig. 2). $k^2$ indicates the nuts on the lower end of the branches of the U-clip $k$ which bear against the lower edges of the braces $d$ and $e$ and secure said braces in position. $de$ is a bolt passing between the branches of the U-clip $k$ and through bolt holes in the braces $d$ and $e$. The nut upon this bolt being firmly set up binds the parts firmly together. $n$ is a plate passing down between the braces $d$ and $e$, bent outward at its upper end and engaging against the nut L which secures the lamp bracket in place. This plate is firmly secured in position by being clamped between the braces $d$ and $e$. $a^2e$ (Figs. 2 and 5) indicates a groove in the upper and inner edge of the brace bar $e$. The inner part of the bracket $a^2$ engages in the groove $a^2e$ to support any inward thrust upon the brace bars. $de^2$ (Fig. 3) is a bolt passing through holes in the bars $d$ and $e$ and binding the said bars firmly in position.

There are two pairs of bolt holes in the brace $e$, the holes in each pair being spaced a short distance apart. These holes are indicated, one pair by the reference characters $e^2$ and $e^3$ and the other by the reference characters $e^4$, $e^5$ (Fig. 3).

In the outer ends of the brace bars $d$ and $f$ there is a pair of bolt holes $c^2$, $c^3$ corresponding to those just described with reference to the inner brace bar $e$.

$m$ indicates the bolt for securing the outer ends of the brace bars $d''$ to the striker cross bars $c$. This has a cross head $m^2$ of a length a little exceeding the width of the bars $c$, $d$, and its ends $m^3$ are turned inward. $m^4$ is a screw-threaded shank which passes through the bolt holes of the bars $e$, $d$ or $f$, and receives a nut for binding the brace bars to the cross bar.

In the above construction the convexity of the striker cross bar $c$ may be regulated. If the bolts $de^2$ and $de$ are placed through the bolt holes as indicated in full lines in Fig. 3, the cross bar will have its greater convexity as indicated in full lines in said figure. With this adjustment the bolt $m$ would engage through the inner bolt hole $c^2$ of the brace bar $d$. If a less degree of convexity is required the brace bar $e$ is moved inward and the bolts $de$ and $de^2$ engage through the bolt holes $e^2$ and $e^4$ and the bolt $m$ engages through the outer bolt hole $e^3$ in the brace $d$ and the striking cross bar takes the position of less convexity shown in broken lines in Fig. 3 with its ends a little further removed from the wheel.

At the rear of the automobile the outer brace bar $f$ is of slightly different form, a portion toward its inner end passing along the inner brace bar $e$ and then bending inward and lying closely against the side piece $a$ where it is closely and firmly clamped by the U-clip $g$ having a cross bar $g^2$. This inner end of the brace bar $f$ may be more firmly secured in position by a nut and bolt passing through a bolt hole in said brace and in the cross bar of the clip.

$j$ is an angle piece having a bolt hole $j^2$ therein and extending over the cross piece $b^2$ of the frame and engaging against the upper surface thereof. The downwardly turned end portion $j^3$ of the angle piece $j$ passes between the braces $e$ and $f$ and is firmly clamped in this position by a bolt $j^4$. The angle piece $j$ is firmly secured in position by the body bolt passing through the aperture $j^2$.

The position of the bar presenting the greater convexity secures more oblique contact with any obstruction located near the side of the vehicle and removes the ends of the cross bar further from the wheel.

It is to be observed that the brace bars are firmly and rigidly connected to the cross bar at whatever position it is adjusted. The bar $c$ is straight and is bent to position and secured in its bent position by the braces. Thus the disassembled apparatus may be packed in a small space for transportation.

What I claim is:

1. In a bumper for automobiles, the combination of a flexible striking cross bar, a pair of braces at each side of the automobile one of said braces engaging toward the outer end of said cross bar and the other of said braces toward the inner end of said cross bar, and means whereby the relative position of said braces may be adjusted and fixed to secure a greater convexity of the cross bar.

2. In a bumper for automobiles, a flexible striking cross bar, a pair of braces at each side of the automobile, one of said braces being secured to the cross bar toward its center and the other toward the end of the same, a pair of bolt holes spaced a proper distance from each other toward the outer end of one of said braces, a bolt for securing the outer end of said brace to the striking cross bar, means for adjusting said braces outward and inward relative to each other, said bolts being adapted to engage through one of the other of said bolt holes and fix said cross bar and braces in their adjusted positions.

3. In a bumper for automobiles, a flexible striking cross bar, a pair of braces at each side of the automobile, one of said braces being secured to the cross bar toward its center and the other toward the end of the same, a pair of bolt holes spaced a proper distance from each other toward the outer end of one of said braces, a bolt for securing the outer end of said brace to the striking cross bar, means for adjusting said braces outward and inward relative to each other, said bolts being adapted to engage through one of the other of said bolt holes, a pair of bolt holes through one of said braces properly spaced with reference to each other located at a point remote from the outer end of said brace, and a securing bolt passing through one or the other of said bolt holes and fix said braces and bar in position.

4. In a bumper for automobiles, the combination of a flexible striking cross bar, braces for supporting said cross bar, said braces being adjustable in position to flex said cross bar into different forms at will.

5. In combination with an automobile having a fender bracket, a pair of brace bars, a striking cross bar secured at the outer end of said braces, said braces lying parallel and adjacent to each other toward their inner ends, a U-clip passing over the fender bracket and between said brace bars, and means for securing said brace bars together and binding them in position by said clip.

6. In combination with an automobile having a fender bracket, a pair of brace bars, a striking cross bar secured at the outer end of said braces, said braces lying parallel and adjacent to each other toward their inner ends, a U-clip passing over the fender bracket and between said brace bars, means for securing said brace bars together and binding them in position by said clip, and a piece *n* clamped between said brace bars adapted to engage against the under side of said bracket and against the nut on the lamp bracket.

7. In combination with an automobile having a fender bracket, a pair of braces, a striking cross bar secured at the outer end of said braces, said braces lying parallel and adjacent to each other toward their inner ends, a U-clip passing over the fender bracket and between said brace bars, and means for securing said brace bars together and binding them in position by said clip, a brace bar being grooved and engaging said fender bracket in said groove.

In testimony whereof, I sign this specification.

FRANK E. PRICE.